Patented Oct. 18, 1932

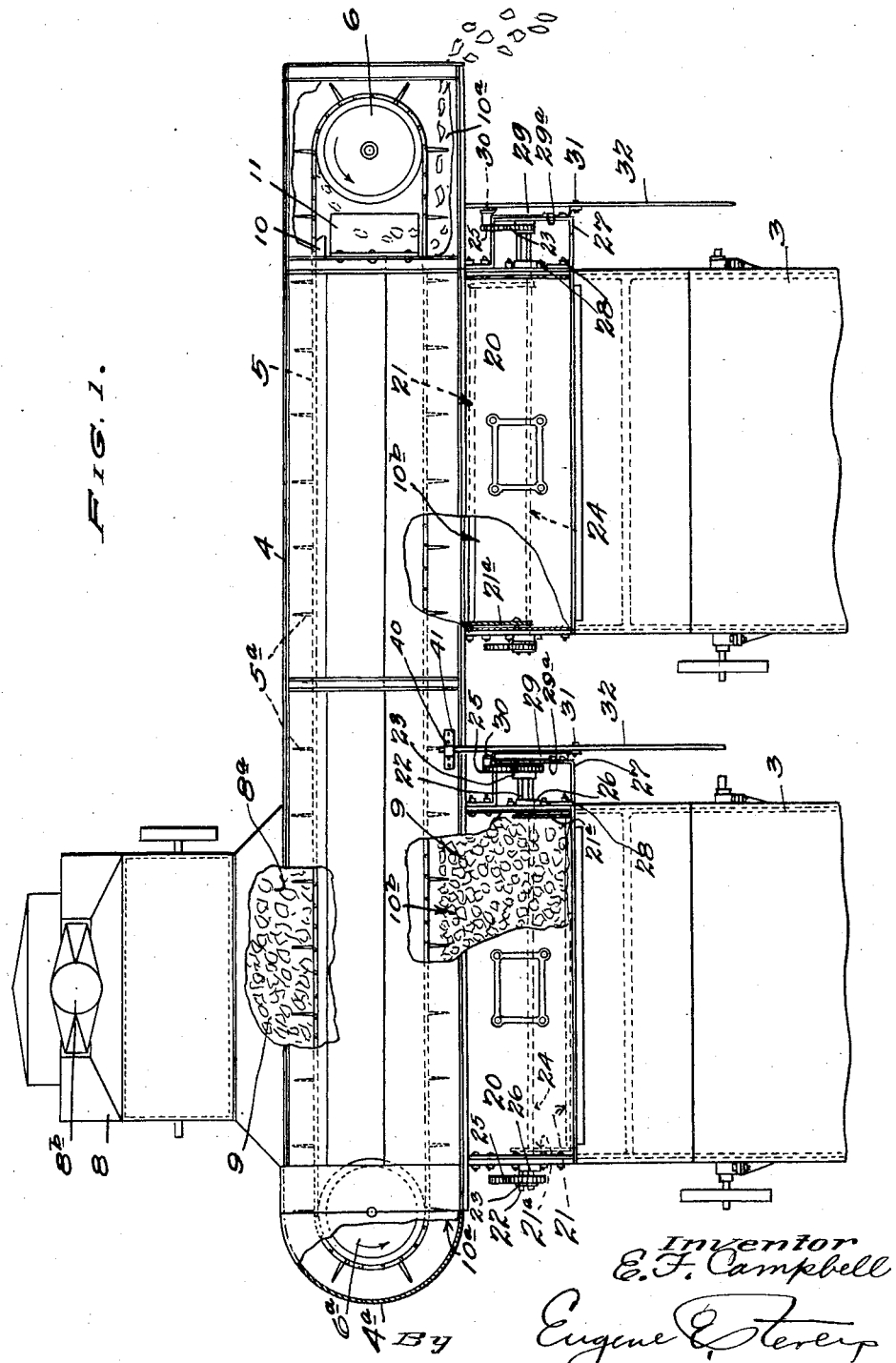

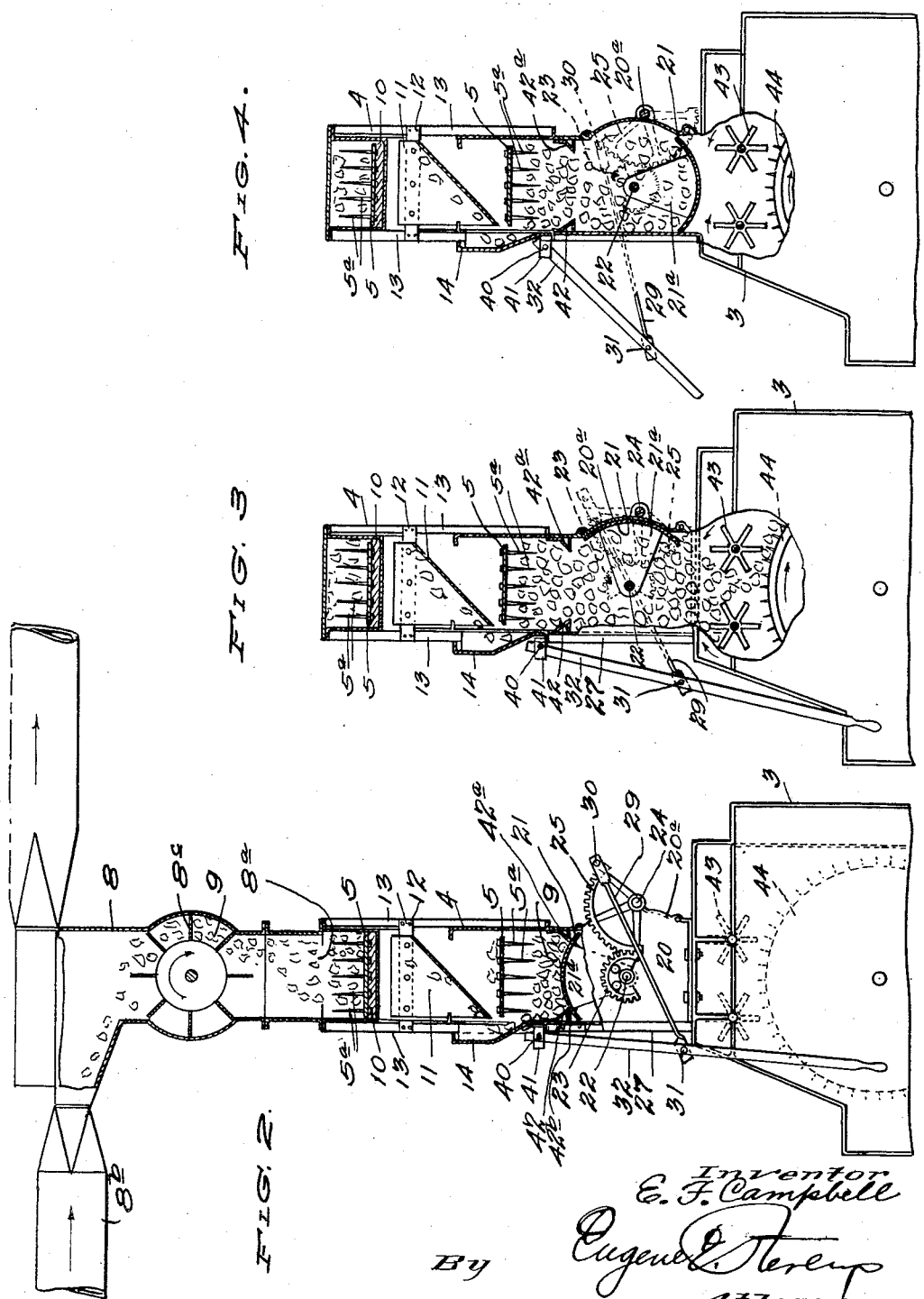

1,883,543

UNITED STATES PATENT OFFICE

ERNEST F. CAMPBELL, OF COLUMBUS, GEORGIA, ASSIGNOR TO LUMMUS COTTON GIN COMPANY, OF COLUMBUS, GEORGIA, A CORPORATION OF GEORGIA

MATERIAL HANDLING APPARATUS

Application filed September 30, 1930. Serial No. 485,451.

My invention relates to material distributing systems, having particular reference to such as are employed in cotton ginning apparatus, and especially for the delivery of seed cotton to the gin feeders.

In conveyor distributing systems for the supply of seed cotton to cotton gins, the cotton has heretofore been supplied directly to the gin feeder. At times the supply of cotton from the distributor will be greater than the feeders can assimilate while at other times the feeder will carry off the cotton a great deal faster than the distributor supplies it. The result is that there is an absence of uniform supply of seed cotton to the feeders, and especially where a small battery of gins is supplied by a single distributor considerable cotton is carried out at the end of the distributor when its load is in excess of what the feeders can assimilate.

With the foregoing in mind, my invention has for one of its primary objects to provide a communicating reservoir or casing interposed between the distributor and each feeder supplied therefrom, and which reservoir or casing will serve for storage purposes when the distributor is supplying cotton faster than the feeder can carry it off, and will serve as a cotton supply for the feeder when the inflow from the distributor falls off, or temporarily stops, thus, assuring a substantially uniform supply of cotton to the gins through the feeders.

It is also an object of the invention to provide in a storage reservoir or casing, interposed as aforesaid between the distributor and the gin feeder, valve means operable to shut off the inflow of cotton through the feeder, and which valve means may be, and preferably is, capable of assuming a position to shut off the inflow of material to said casing; or to permit filling of said casing while shutting off the flow of cotton to the feeder,—which latter function is particularly important when the gin is not in operation, although the distributor is running, and also of course the drum of the feeder.

Eliminating specific details,—the invention contemplates broadly in a conveyor distributor system for cotton gin feeders, for instance,—means which will give the ginner adequate control of the cotton supply to the gin to the end that the ginning operation may be more efficiently and economically performed.

In its more limited aspect, the invention contemplates the provision of a storage space or chamber, interposed between the distributor and gin feeder and, which incorporates a novel manually operable valve, arranged to assume a position for cutting off the supply of material to said storage chamber, and which is also manually operable to cut off supply of material to the gin while the storage chamber is being filled,—there being incorporated novel latch means for maintaining the valve in a desired position and indicating to the operator the position of the valve at all times.

The invention also resides in certain novel features of construction, combination and arrangement of the various parts in certain modes of operation,—all of which will be readily understood and appreciated by those skilled in the art upon reference to the accompanying drawings in connection with the detailed description appearing hereinafter.

While the disclosure herein depicts what now appears to be a preferred example of the invention,—yet it is to be understood that the same is capable of other mechanical expressions within the spirit and scope of the subject matter claimed hereinafter and forming a part of this specification.

In the drawings,

Figure 1 is an elevational view partly broken and partly in section and showing the application of my invention to a battery of gin feeders and the associated conveyor and distributor members of the supply system;

Figure 2 is an end elevational view of a feeder and illustrating the associated distributor and interposed valve controlled storage casing,—the latter being illustrated mainly in cross section;

Figure 3 is a view similar to Figure 2 showing the distributor and valve controlled storage casing in cross section, without the separator, and showing a portion of the feeder broken away to illustrate the feed rolls, and, Figure 4 is a view similar to Figure 3, but showing the storage chamber valve in a different position from that it assumes in Figure 1 and also from that assumed in Figure 3.

Referring specifically to the drawings, wherein the same reference characters have been used to designate the same parts in all views, numeral 8 denotes a novel separator receiving the seed cotton from the source of supply through the conveyor 8b and having, as shown, a driven member 8c for discharging the cotton 9 down through the opening 8a upon the belt distributor 5 in the casing 4.

As shown, the conveyor members 5a of the distributor 5 carry the cotton 9 along the bottom 10 of the upper distributor trough toward the closed end 4a of the distributor casing 4 and down into the lower trough 10a which has the openings 10b through which the cotton passes on its way to the feeders 3.

The endless belt is trained over pulleys 6, 6a, and as will be noted there is a deflector 11 receiving the cotton from between the pulley 6 and the upper flight of the belt 5 and deflecting it laterally into the chute 14 which discharges beneath the lower flight of the belt 5. This construction has been made the subject of a separate application Serial No. 485,450 filed Sept. 30, 1930 for patent and need not be referred to specifically herein, although it may be observed that the deflector 11 is carried by cross member 12 supported by uprights 13.

Coming now to the subject matter comprising the present invention, numeral 20 denotes a casing interposed between the distributor casing 4 and the feeder 3, and through which the cotton 9 passes on its way to the feeder. This casing 20 serves as a storage casing and has therein an arcuate plate valve 21 carried by segmental end portions 21a which are keyed or rigidly fastened to short shaft sections 22 extending through the end walls of the casing 20. Shafts 22 have keyed upon their outer ends segmental gears 23 which are adapted to mesh with segmental gears 25 carried upon a shaft 24 journalled in bearings at one side of the casing 20, as clearly shown at Figures 2, 3 and 4.

Bearings 26 are provided for the short shaft sections 22 as best shown in Figure 1.

Figure 1 of the drawings illustrates two feeders and two casings 20 with associated parts, and since both are identical the description of one will suffice for both.

Referring to Figure 1, it will be noted that one end of the casing 20 is provided with a substantially U-shaped strap metal keeper member 27 which is bolted to the end wall of casing 20, as indicated at 28 to project beyond of the plane of the gear segments 23, 25. This member 27 forms a part of a latch as will appear shortly.

Pivoted, as at 30, to one side of the gear segment 25 is the strap metal link 29 whose ends are twisted as shown and whose outer end is pivoted as at 31 to the hand lever 32 whose upper end is pivoted as at 40 to a bearing 41 secured to one side of the distributor casing 4 adjacent the bottom thereof.

By swinging the lever 32 about its pivot 40, the valve 21 will be actuated through the movement of shafts 22, induced by the engagement of gear segments 23, 25 through the action of link 29 on gear segment 25. In order to hold the valve 21 in a predetermined position, and also in order that the operator may know what the position of the valve is at all times, I provide the strap metal link 29 with side notches 29a in its edge which is adjacent to, and works against, the bight portion of the U-shaped strap metal keeper member 27.

Referring to Figure 2, it will be noted that the valve 21 is disposed upwardly to close the outlet of casing 4 into casing 20. In this position the outermost notch 29a of the link 29 will be engaged with the bight portion of the keeper strap 27 so as to prevent movement of the valve 21 and to indicate to the operator that the inlet into the casing 20 is closed.

Referring to Figure 3 the lever 32, as will be noted, has been pulled outwardly and the inner notch 29a (see Fig. 1) engaged with the bight portion of the keeper strap 27, thus, to hold the valve 21 in the arcual side recess 20a of casing 20 so as to permit the cotton 9 to flow down through the casing 20 and upon the feed rolls 43 and feeding drum 44 of the feeder 3.

Referring to Figure 4, the valve 21 is shown in its lowest position so as to seal the outlet from the casing 20 to the feeder. In this position the lever 32 is at its outermost limit of movement and this limit is defined by the engagement of the valve 21 with the perpendicular wall of the casing 20. It is, therefore, impossible to move the valve further in a clockwise direction as viewed in Figure 4. In this position of the valve 21 neither of the notches 29a of the strap member link 29 are engaging the bight portion of the keeper strap 27.

The deflector members 42, 42a are to be noted in each of Figures 2, 3 and 4 as located at each side of the casing 20 and just inwardly of the mouth thereof. One function of these deflectors 42 is to direct the cotton inwardly so as to prevent its packing against the sides of the casing 20.

It is also very important to note that the deflector 42 is positioned to provide a gap or space 42b between it and valve 21 when the latter is closed, as in Figure 2. Thus, if any cotton is hanging over or is engaged with the advancing edge of valve 21, space 42b permits the passage of same past deflector 42, thus to assure free movement of the valve to the position shown in Figure 2 to complete closing of the inlet of casing 20. However, space 42b is so small that cotton will not pass therethrough from above the valve.

It is to be noted that there is absolutely no interference to the passage of the cotton 9 through the casing 20 when the valve is in the position shown in Figure 3. Here, the valve 21 is disposed in the arcual side recess 20a of the casing 20 and inwardly of the plane of the deflector 42a so that the cotton will not come into contact therewith; also the shafts 24 and 22 will not obstruct the passage of cotton since the former is outside the casing, and the latter shafts merely project from the segmental valve ends 21a through the adjacent casing walls.

The advantages of my construction have been pointed out generally in the introductory part of this specification,—it being readily apparent, for instance, that when the valve 21 is in the position shown in Figure 2 the ginner will be enabled to shut off all cotton from the casing 20 and likewise from the feeder 3. This is in many instances desirable. Also since the valve 21, in the position shown in Figure 2, is substantially below the conveyor belt 5 and the ends of the prongs 5a, there will be provided a small quantity of cotton within the casing 20 and upon the valve which will be dropped upon the feed rolls 43 when the valve is moved to the position shown in Figure 3,—a circumstance which enables the ginner to supply a good starting quantity of cotton to the feeder without filling the casing 20,—as for instance when the distributor belt 5 is carrying a large supply of cotton.

Now turning to Figure 4, the valve 21 is shown at its lowest position, so as to seal the casing 20 at its lower end and prevent passage of cotton to the feed rolls 43 of the feeder 3. This position of the valve will be especially advantageous when the gin is not in operation, as it prevents cotton from being dropped through the feed rolls 43 (which are stationary when the gin is stopped) upon the rotating feeder drum 44 which is in operation at all times whether the gin is in operation or not.

It is very undesirable that cotton be supplied to the gin by the feeder drum 44 when the gin is not operating. Thus, the valve in its position shown in Figure 4 enables the casing 20 to be filled and obviates the necessity of stopping the distributor belt 5. When, as for instance, there is a change in source of supply of cotton to the conveyor pipe 8, the supply of cotton in the distributor 4 will be temporarily reduced or exhausted, but the gin may be kept in operation through the supply of cotton in casing 20.

As will be manifest, the valve 21 can be shifted at will from the position shown in Figure 4 to the positions disclosed in Figures 2 and 3, or from the Figure 2 position to the Figure 3 position regardless of the fact that the casing 20 may be full of cotton. However, for free shifting of the valve from the positions shown in Figures 2 and 3 to that of Figure 4 the casing 20 should be empty, or substantially so.

Having thus described my invention, what I claim as new and desire to secure by Letters Patent is:

1. In combination with a supply means for a cotton feeder or the like, a communicating supply reservoir disposed between said supply means and feeder, and a single valve means within said reservoir and operable to shut off the supply of material from the supply means to the reservoir when in one position and movable to another position for shutting off the supply of material from said reservoir to the feeder while permitting said reservoir to receive cotton from said supply means.

2. In combination with a supply means for a cotton feeder or the like, a communicating supply reservoir disposed between said supply means and feeder, a valve in said reservoir, mounting means for said valve and permitting movement of the same to a position to close the inlet and outlet of said reservoir, said mounting means being clear of the material within said reservoir.

3. In combination with a supply means for a cotton feeder or the like, a communicating supply reservoir disposed between said supply means and feeder, a valve in said reservoir, mounting means for said valve and permitting movement of the same to a position to close the inlet and outlet of said reservoir, said mounting means being clear of the material within said reservoir, and manual means associated with said valve mounting means for actuating the same.

4. In combination with a supply means for a cotton feeder or the like, a communicating supply reservoir disposed between said supply means and feeder, a valve in said reservoir, mounting means for said valve and permitting movement of the same to a position to close the inlet and outlet of said reservoir, said mounting means being clear of the material within said reservoir, manual means associated with said valve mounting means for actuating the same, and latch means for maintaining said valve in a predetermined position.

5. In combination with a supply means for a cotton feeder or the like, a communicating supply reservoir disposed between said supply means and feeder, a valve in said reservoir, mounting means for said valve and permitting movement of the same to a position to close the inlet and outlet of said reservoir, said mounting means being clear of the material within said reservoir, manual means associated with said valve mounting means for actuating the same, and latch means for maintaining said valve in a predetermined position, said manual means including pivotally connected levers, and one of said levers forming an element of said latch means.

6. In the combination of a cotton gin feeder and its supply distributor, a supply casing interposed between said feeder and distributor and communicating with both of the same, a swingable plate valve of arcual cross section, and disposed within said casing, shafts extending through the end walls of said casing and said valve having inturned legs connected to the inner ends of said shafts, one side wall of said casing being arcually dished in cross section to conform to said valve and the path of movement thereof, and the other side wall of said casing being positioned to provide a stop to engage said valve to limit the movement thereof in each direction toward said last mentioned wall, and lever controlled means for actuating one of said valve engaged shafts to actuate the valve to a position to close said casing inlet and outlet.

7. In a cotton gin feeder, a reservoir-providing casing supported upon the feeder for communication therewith and adapted to receive material from a supply means, means for actuating said valve to a predetermined position in said casing whereby it may exclude cotton from entry to the casing or to the feeder as may be desired, and means for locking said valve in either position.

In testimony whereof I affix my signature.

ERNEST F. CAMPBELL.